United States Patent

Basman

[15] 3,671,969
[45] June 20, 1972

[54] AUTOMATIC ANTENNA ALIGNMENT SYSTEM FOR ENABLING MAXIMUM SIGNAL RECEPTION

[72] Inventor: Vefik A. Basman, 7290 Fosdick Road, Saline, Mich. 48176

[22] Filed: Jan. 30, 1970

[21] Appl. No.: 7,290

[52] U.S. Cl. ....................................................343/117 R
[51] Int. Cl. ............................................................G01s 3/44
[58] Field of Search ...............................................343/117 R

[56] References Cited

UNITED STATES PATENTS

| | | | |
|---|---|---|---|
| 3,206,754 | 9/1965 | Morris | 343/117 |
| 3,312,973 | 4/1967 | Rogers | 343/117 |
| 2,597,424 | 5/1952 | Znaidukas | 343/117 |
| 3,524,187 | 8/1970 | Holley, Jr. | 343/117 |
| 2,950,478 | 8/1960 | Reppert | 343/117 |

*Primary Examiner*—Benjamin A. Borchelt
*Assistant Examiner*—R. Kinberg
*Attorney*—A. Yates Dowell and A. Yates Dowell, Jr.

[57] ABSTRACT

An automatic antenna alignment system for enabling maximum signal reception includes a storage circuit for storing the maximum energy developed by a receiver as a directional antenna is rotated through a first revolution and a comparator for comparing the signal stored during the first revolution with the signal developed by the receiver during a second antenna revolution such that when maximum signal reception occurs during the second revolution, the output of the comparator will trigger a switch and thereby stop the antenna in the direction of optimum alignment for maximum signal reception.

4 Claims, 2 Drawing Figures

INVENTOR
VEFIK A. BASMAN

AUTOMATIC ANTENNA ALIGNMENT SYSTEM FOR ENABLING MAXIMUM SIGNAL RECEPTION

BACKGROUND OF THE INVENTION

This invention relates to antenna aligning systems and more particularly to an automatic antenna aligning system for enabling a directional antenna to be automatically positioned in a direction for receiving a maximum signal strength.

In the field of communication equipment, either of the home entertainment or commercial type, such, for example, as in the field of Television, FM Radio, Citizens' Band Radio, and Amateur Radio, it is necessary for the highest quality of reception to be able to align the receiving antenna in a direction for enabling maximum signal strength reception. This generally requires that the receiving antenna be rotated and pointed towards the transmitting antenna.

In the past, antenna alignment has been accomplished both manually and automatically. For example, one prior art manner of manually aligning an antenna was to turn the same while either listening for maximum signal strength or by reading a meter placed within the antenna line and responsive to energy of the desired frequency range of reception. Another prior art manner of aligning an antenna was to utilize a motor which electronically rotated the antenna while again one either listened for maximum signal strength or read an appropriate meter. While somewhat satisfactory, the above methods of antenna positioning being of the trial and error method, are quite time-consuming and of limited accuracy.

Others have improved somewhat upon the basic antenna alignment methods described above by developing systems for automatically locating the point of maximum signal strength and for positioning the antenna in that direction. Thus, Roy L. Rogers in U.S. Pat. No. 3,312,973, discloses a system in which an antenna is rotated in one direction for 360° and then reversed to scan around the direction of maximum signal in sectors of ever-diminishing width until the antenna stops at substantially the optimum direction. While again somewhat satisfactory, the prior art automatic antenna aligning system described above requires that the antenna continuously reverse directions and also requires a somewhat time-consuming sector for locating the direction of maximum signal strength.

SUMMARY OF THE INVENTION

Accordingly, it is one object of the present invention to provide a new and improved antenna aligning system.

Another object of this invention is the provision of a unique antenna aligning system for automatically enabling an antenna to be pointed in a direction for receiving a maximum signal strength.

Still another object of the subject invention is to provide a new and improved unique antenna aligning system which requires less than two antenna revolutions, both of which may be in the same direction.

A still further object of the present invention is the provision of a unique antenna acquisition and aligning system for directional antennas which is compact, simple to construct, and inexpensive.

One other object of this invention is to provide a new improved unique automatic and electronic antenna positioning system for pointing an antenna in a direction of maximum signal strength which may be used with any receiver whose internal circuitry can develop a signal directly or inversely proportional to the energy absorbed by its antenna at the particular frequency to which the receiver is tuned.

Briefly, in accordance with this invention, these and other objects are in one aspect obtained by automatically rotating a directional antenna through a first revolution and storing the maximum energy received during that revolution and for stopping the antenna during a second revolution at the point wherein the maximum energy received during the first revolution was obtained whereby optimum signal reception is realized.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings, wherein.

DETAILED DESCRIPTION OF THE PREFERRED EMBODIMENTS

Figure 1:
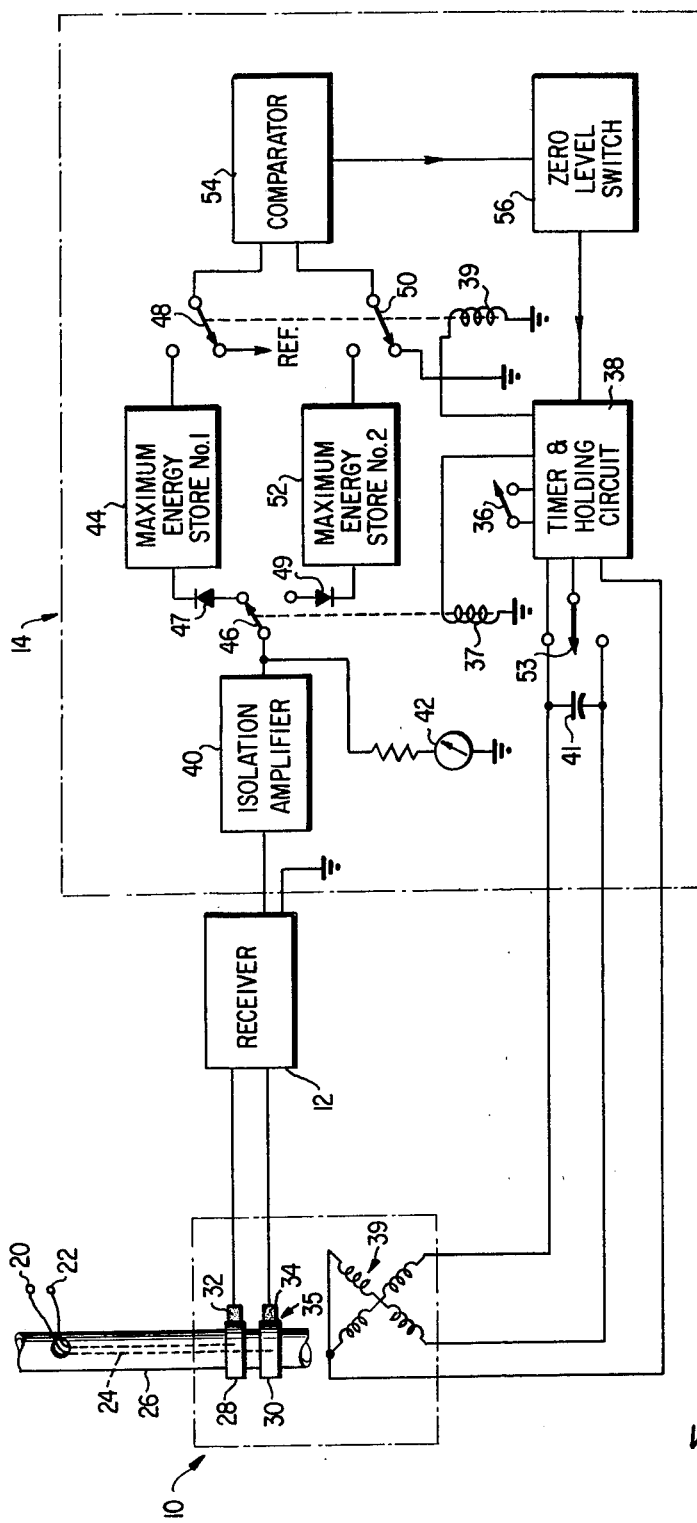
FIG. 1 is a block diagrammatic view of one preferred embodiment of the automatic antenna alignment system for enabling maximum signal reception according to the present invention; and, FIG. 2 is a block diagrammatic view of an alternative embodiment of the automatic antenna alignment system for enabling maximum signal reception according to the present invention.

Referring now to the drawings, wherein like reference numerals designate identical, or corresponding parts throughout the several views, and more particularly, to FIG. 1 thereof, wherein the automatic antenna alignment system of the present invention is shown as including basically a rotator assembly 10, a receiver portion 12 and an electronic control assembly 14. The receiver portion 12 may be for example, a Television, an FM Radio, a Citizens' Band Radio, an Amateur Radio, or the like. In fact, the receiver portion 12 could be any receiver which covers the frequency spectrum of VHF, UHF, L-Band, S-Band, X-Band, K-Band, and other frequency ranges up to 100 Gigahertz. The electronic control assembly 14 may be readily mounted upon printed circuit boards or the like and housed within or exterior to the receiver portion 12.

In operation, a signal receiver by any standard directional antenna having a high front to back ratio (not shown) is passed at the antenna terminals 20 and 22 through a transmission line 24 within an antenna shaft 26 to the rotor rings 28 and 30 of a slip ring assembly generally indicated at 35. The brushes 32 and 34 of the slip ring assembly 35 are connected to the receiver 12 by means of a transmission line.

It should be understood that the slip ring assembly 35 is provided to permit feed-through of the signal from the antenna to the receiver 12 during the continuous rotation of the antenna shaft 26. The slip ring assembly 35 is packed in a silicone compound or the like to assure low noise contact, to prevent corrosion, and to provide stability of the characteristic impedance. It should be further understood that the characteristic impedance of the slip ring assembly 35 may be such as to match the antenna to 75 Ohm, 300 Ohm, or any other transmission line impedance required by the particular receiver and antenna being used.

Rotation of the antenna in azimuth by the shaft 26 may, by way of example, be accomplished by means of a conventional instantaneously reversible 24–30-volt A-C capacitor run motor and reduction gear assembly, the windings of which are shown and indicated at 39. In addition, the antenna shaft 26 has no mechanical stops and is therefore free, when activated, to rotate continuously in either the clockwise or counterclockwise direction with no limit to the angular travel of the shaft. A phasing capacitor 41 for the motor may be housed within the electronic control assembly 14 and depending upon the position of a switch 53 will allow the antenna shaft 26 to rotate in either direction desired. Mechanical braking is used to lock the antenna shaft 26 in position when no command signal is received from the electronic control assembly 14 for rotating the shaft.

An automatic cycle start push button 36 is used to activate a timer and holding circuit 38 which, in turn, sends a command signal to power the rotator assembly 10. The timer and holding circuit 38 may be a unijunction transistor time delay circuit which holds power to the rotator assembly 10 by means of relay contacts for a fixed period of time. During a first complete rotation of the antenna shaft 26 through 360° the input voltage received by the receiver 12 is used to develop a signal directly or inversely proportional to the energy absorbed by the antenna at the particular frequency to which the receiver 12 is tuned. This signal may be, for example, the generated bias voltage which controls the gain of the receiver 12 and is then amplified and inverted by an adjustable gain isolation amplifier 40. The isolation amplifier 40 may be a high input impedance (greater than 3 Megohms), low output impedance amplifier of adjustable gain and have the format of a conventional operation amplifier with a closed feedback loop. A conventional voltmeter 42 may be inserted at the output of the isolation amplifier 40 for indicating the antenna signal strength or energy absorbed by the antenna. The output of the isolation amplifier 40 is then fed into a first maximum energy level storage circuit 44 through a diode 47. The voltage of greatest magnitude presented to the system during the first complete rotation of the antenna through 360° will be stored in the circuit 44. It should be understood that the maximum energy storage circuit 44 is an active circuit which may, by way of example, consist of very high input impedance (greater than 100 Megohms), low output impedance operational amplifiers connected as source followers. The maximum energy level may be stored in a low leakage capacitor such, for example, as capacitors having dielectrics of mylar, polystyrene or the like and the capacitor is connected across the input of the amplifier. The isolation diode 47 which may have a very high reverse resistance characteristic, such as of 600 PIV or greater, is used to prevent the storage capacitors from being discharged back through the source circuitry. The timing and holding circuit 38 will time out after a fixed period during which the antenna shaft 26 will make the desired one complete revolution. At this time, multiple gang relay switches 46, 48 and 50 will be activated and cause the output of the isolation amplifier 40 to be transferred to a second maximum energy level storage circuit 52 through switch 46 and to the inputs of a comparator 54 which is switched from a voltage reference and ground to the outputs of the maximum energy level storage circuits 44 and 52, respectively. The maximum energy storage circuit 52 may be identical to that described above with reference to the maximum energy storage circuit 44. Additionally, relay coils 37 and 39 are provided for respectively switching the gang switches 46, 48 and 52. The comparator 54 may be a conventional difference amplifier, the output of which is zero for two identical input voltages. Now, as the antenna shaft 26 is rotated for the second time in the same direction as the first, at some point the maximum energy stored in circuit 52 will be equal to that stored in circuit 44. That point will be when the antenna is aligned in the direction of maximum strength reception of the receiver 12. At that point, since the inputs to the comparator 54 will be equal, the output therefrom will be zero and thereby trigger a conventional 0-voltage level switch 56. Upon activation, the 0-level switch 56 will disconnect power from the timer and holding circuit 38 which, in turn, stops the antenna shaft motor and resets the circuitry to its initial conditions. It should now be apparent that the directional antenna will then be aligned in the direction for enabling the receiver 12 to receive a maximum signal at the particular frequency to which it is tuned. Optionally, a conventional rocker switch may be provided to enable the rotator to operate in a manual mode rather than in the automatic mode as described above.

Figure 2:
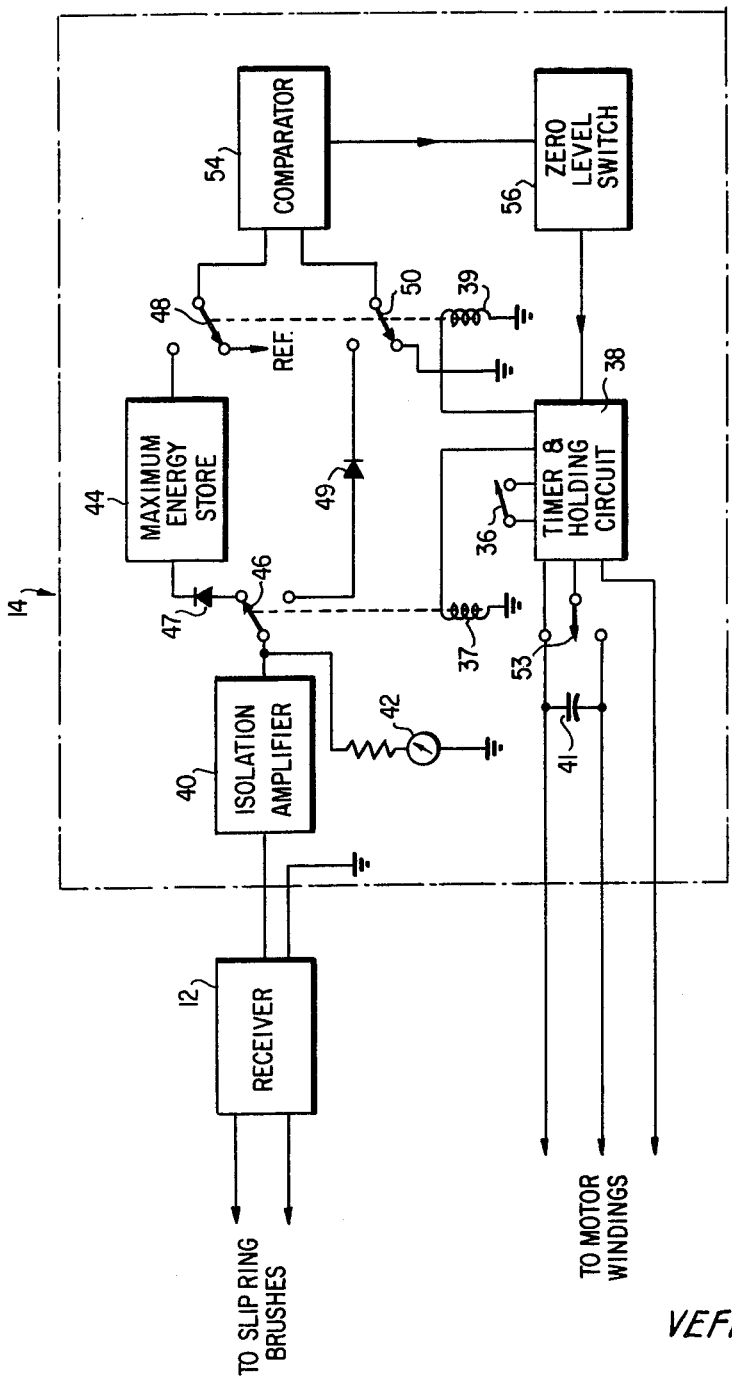

Referring now to FIG. 2, an alternative embodiment of the antenna alignment system of the subject invention is shown and is similar to that described above with reference to FIG. 1, except the second storage circuit 52 is eliminated therefrom and the signal from the isolation amplifier 40 is, during the second rotation of the antenna shaft 26, directly compared through isolation diode 49 with the value of the maximum energy stored in circuit 44.

It should now be apparent that the system of the herein-described invention allows for the rapid and automatic alignment of a directional antenna for enabling optimum signal reception and that the system is compact, simple in construction, and inexpensive.

Obviously, numerous modifications and variations of the present invention are possible in light of the above teachings. For example, while the system has been described as utilizing the receiver bias control voltage to determine the maximum strength signal, it should be understood that the invention is not so limited and that, for example, in a television, the vertical synchronous pulses, horizontal synchronous pulses, composite video signal, I.F. signal, R.F. carrier or the like could be readily utilized to determine the maximum strength signal. It is therefore understood that within the scope of the appended claims, the invention may be practiced otherwise than as specifically described herein.

What is claimed as new and desired to be secured by Letters Patent of the United States is:

1. Apparatus for aligning a directional antenna comprising means for rotating said antenna in azimuth, receiver means for receiving energy impinging upon said antenna as said antenna is rotated, first storage means for storing a first energy indicating the direction of maximum power during a first complete revolution, second storage means for storing a second energy indicating the direction of maximum power impinging upon said antenna during at least a portion of a second revolution, comparison means for comparing the maximum power of said first energy to the maximum power of said second energy, said comparison means controlling switch means, and timer and holding circuits responsive to said switch means for stopping said means for rotating when the direction of said first and second powers are aligned, whereby said antenna is aligned in the direction of maximum power of said first energy for optimum reception.

2. The structure of claim 1 in which the maximum power of said second energy is substantially the same as the maximum power of said first energy, and said switch means includes a zero level switch.

3. The structure of claim 1 in which said means for rotating said antenna includes a reversible motor.

4. The structure of claim 1 including isolation amplifier means located between said receiver means and said first and second storage means.

* * * * *